United States Patent [19]
Knight

[11] Patent Number: 4,637,529
[45] Date of Patent: Jan. 20, 1987

[54] MEASURING DISPENSER

[76] Inventor: George L. Knight, 305 Larkin Dr., Benicia, Calif. 94510

[21] Appl. No.: 553,141

[22] Filed: Nov. 17, 1983

[51] Int. Cl.⁴ .............................................. G01F 11/28
[52] U.S. Cl. .................................... 222/452; 222/454; 222/556
[58] Field of Search ..................... 222/424.5, 425, 450, 222/451, 452, 454, 456, 484, 556, 455, 457, 478, 483; 221/288

[56] References Cited

U.S. PATENT DOCUMENTS

| | | | |
|---|---|---|---|
| 513,803 | 1/1894 | Luster | 222/452 X |
| 2,021,444 | 11/1935 | Duell | 222/451 |
| 2,748,995 | 6/1956 | Hightower et al. | 222/452 X |
| 3,036,742 | 5/1962 | Wagoner et al. | 222/450 X |
| 3,052,385 | 9/1962 | Tindall | 222/454 |
| 3,059,817 | 10/1962 | Tregoning | 222/561 X |
| 4,219,136 | 8/1980 | Williams et al. | 222/450 |

Primary Examiner—Joseph J. Rolla
Assistant Examiner—Michael S. Huppert

[57] ABSTRACT

A measuring dispenser for particulate material adapted to be placed in a carton of soap or the like comprising a right-triangular receptacle with a divider panel extending from the top panel of the carton along the fold line along which one end of the top panel is pivoted between open and closed position. A closure panel extends down from the top flap to cover a fill opening in the divider panel when the top flap is opened, but pivots away from the divider panel to allow the measuring receptacle to be filled when the box is tilted with the top closure closed.

2 Claims, 3 Drawing Figures

MEASURING DISPENSER

BACKGROUND OF THE INVENTION

Many particulate materials are used in the same measured amount each time. For example, laundry products, such as soap or detergents are dispensed and used in carefully measured quantities in order to provide satisfactory cleaning while avoiding excessive foaming or chemicals that may cause damage to appliances and fabrics. Accordingly, it is customary to keep a measuring cup handy at the laundry facility or, when public facilities are used, a measuring cup should be included with the coins, soaps and other supplies taken to the laundry.

OBJECTS OF THE INVENTION

It is an object of this invention to provide a carton for particulate material with means for dispensing a measured amount.

It is a further object of this invention to provide a measuring dispenser for particulate material that is formed as part of the carton construction.

It is a further object of this invention to provide a measuring dispenser that may be incorporated into a conventional carton for soap or the like.

It is a further object of this invention to provide a measuring dispenser for a carton that can be utilized without requiring one to dip into the carton.

Other objects and advantages of this invention will become apparent from the description to follow, particularly when read in conjunction with the accompanying drawing.

SUMMARY OF THE INVENTION

In carrying out this invention, I provide a right-triangular dispenser of measured volume with one leg of the right triangle being secured to or forming part of a narrow end wall of the carton. The panel forming the hypotenuse extends from the top panel of the carton to the end wall and the lid for the measured container is formed by that part of the top panel that is folded back to enable pouring material. An opening is formed in the "hypotenuse" panel so that when the carton is tilted the container is filled. A closure panel depends from the "fold-back" portion of the top panel to pivot therewith so that when the top is open for pouring the closure panel is moved against the face of the "hypotenuse" panel to close off the fill opening, allowing the soap or other particulate material to be poured directly from the measured receptacle.

DESCRIPTION OF PREFERRED EMBODIMENTS

Figure 1:
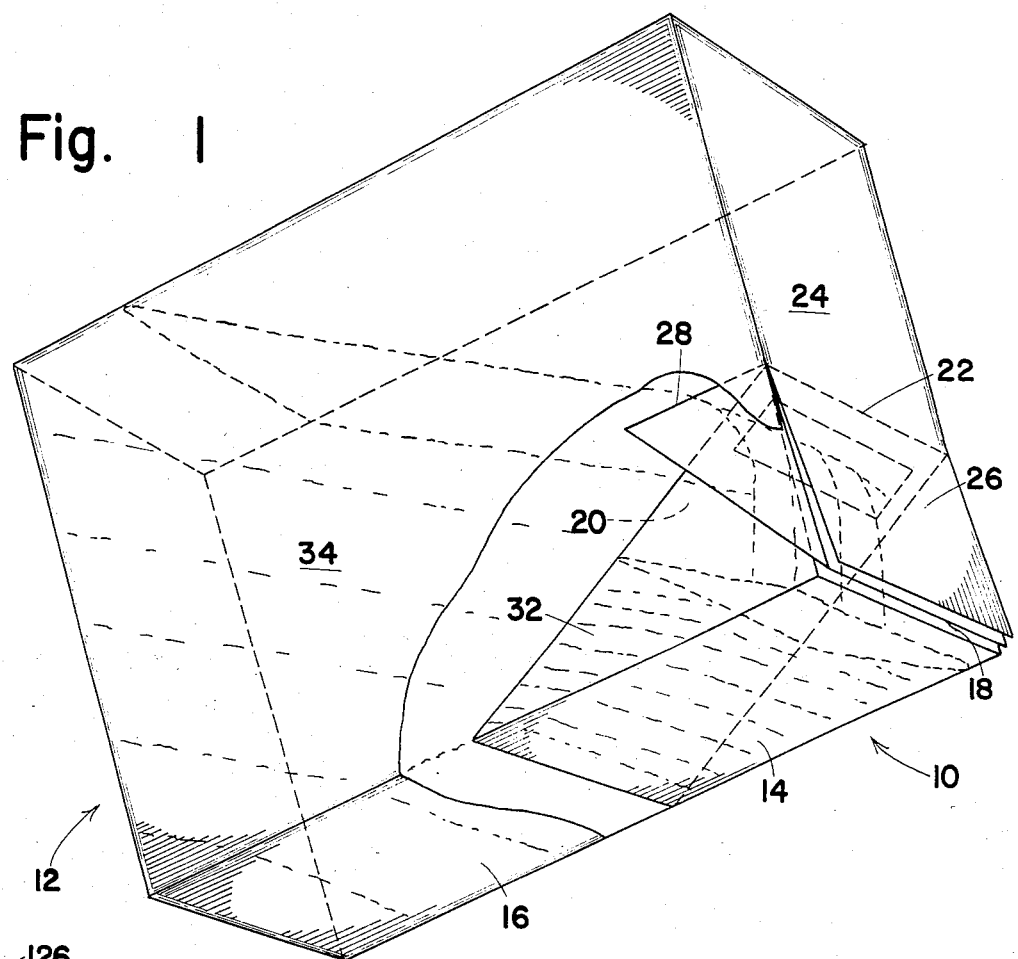
FIG. 1 is a view in perspective, partially broken away, of a carton embodying one embodiment of the measuring dispenser of this invention.
Figures 2, 3:
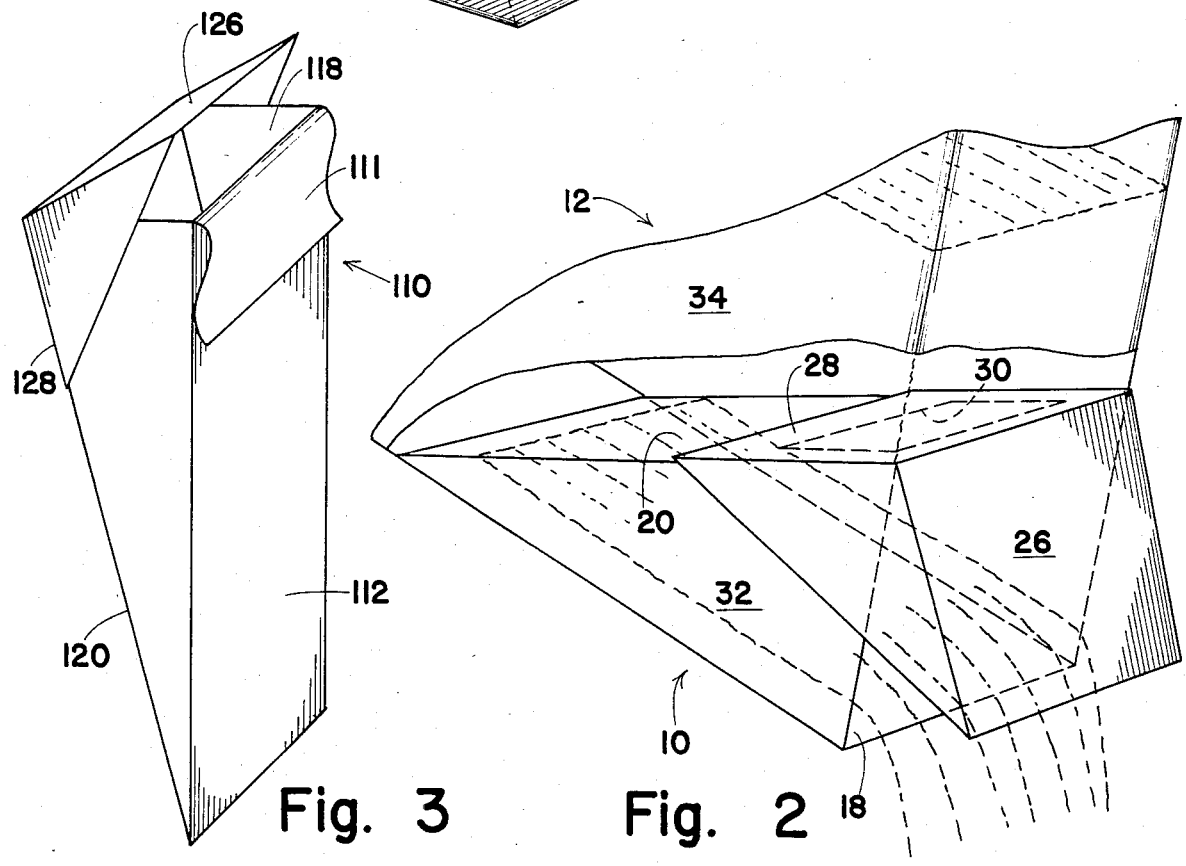
FIG. 2 is a partial view in perspective of the carton as opened for pouring.
FIG. 3 is a view in perspective of another embodiment of this invention.

The Embodiment of FIGS. 1 and 2

Referring now to the drawings with greater particularity, the measuring dispenser 10 of this invention may be built into or formed as part of a carton 12 for powdered material, such as soap, detergent or powdered bleach which are normally used in measured quantities. The measuring dispenser 12 is of right-triangular configuration of measured volume, say one cup, with one right-triangular leg panel 14 being adhered to or forming part of a narrow end panel 16 of the carton 12. The other right-triangular leg is formed by the open top 18 of the dispenser 10. The "hypotenuse" panel 20 extends from substantially along the fold line 22 of the top panel 24, i.e. the hinge line, alog which the top panel is hinged for pouring the contents, and then down and across to the end panel 16 to form a measuring receptacle of the desired volume.

The lid 26 for the measuring receptacle 10 may be adhered to or formed by the top panel 24 itself so that when the carton is closed, as shown in FIG. 1, the measuring receptacle 10 will be closed by engagement of the lid portion 26 across the open top 18. Depending from the lid 26 is a closure panel or gate 28 that pivots with the lid 26 from a position displaced from the hypotenuse panel 20 when the carton 12 is closed as shown in FIG. 1, to a position in engagement with the hypotenuse panel 20 when the lid is pivoted to open position, as shown in FIG. 2. A fill opening 30 in the hypotenuse panel is thus covered and uncovered by the closure panel 28 in its two pivoted positions. Side panels 32 for the measuring dispenser 10 may be adhered to or formed as part of the side panels 34 of the carton 12.

In operation, the carton may be tilted as shown in FIG. 1 while the lid 26 is closed to enable the particulate material to enter through the uncovered fill opening 30 until the measuring receptacle 10 is filled. Then, the lid may be pivoted upward to position shown in FIG. 2 whereby the fill opening 30 is closed off while the particulate material is poured from the carton as shown in FIG. 2.

The Embodiment of FIG. 3

For installation in a conventional carton of soap, detergent or the like, a separate dispenser 110 of plastic or the like may be provided with a flexible clip 111 to snap over the top edge of an open carton. In position, the right-triangular leg 112 is disposed along the end panel of the carton with the open top 118 at the top of the carton. As in the embodiment of FIGS. 1 and 2, the lid 126 will be closed when the carton is closed, and this will displace the closure panel 128 from the hypotenuse panel 120 so that the dispenser 110 may be filled.

While this invention has been described in conjunction with a preferred embodiment thererof, it is obvious that modifications and changes thereto may be made by those skilled in the art to which it pertains without departing from the spirit and scope of this invention, as defined by the claims appended hereto.

What is claimed as invention is:

1. A measuring dispenser for particulate material comprising:
   an open top receptacle with a pair of side walls of generally triangular configuration;
   the top and front edges of said side walls forming substantially right angles;
   front and rear walls interconnecting the front and rear edges of said side walls;
   means forming a fill-opening in said rear wall near said open top so that said receptacle may be filled by tipping same to bring said front wall downward;
   a lid hinged to the top edge of said rear wall; and a fill-opening closure depending from the rear of said lid to pivot therewith;

said fill-opening closure being disposed at an angle to said lid greater than the angle between the top and rear edges of said side panels so that it may be pivoted with said lid into engagement with said rear wall to cover said fill-opening when said lid is lifted.

2. A carton for particulate material comprising:

upright side and end panels;

a top panel interconnecting the top edges of said side and end panels;

one end of said top panel being pivotable along a hinge line between closed and open positions;

a divider panel extending from said hinge line to one of said end panels;

side panel means joining said divider panel and said one end panel to form a receptacle;

means forming a fill opening in said divider panel so that said receptacle may be filled by tipping said carton; and a fill closure depending from said top panel along said hinge line to pivot with said one end between an open position when said one end is in its closed position and a closed position in face to face engagemet with said divider panel covering said fill opening when said one end is in its open position.

* * * * *